(12) United States Patent
Seshadri

(10) Patent No.: US 8,997,205 B1
(45) Date of Patent: Mar. 31, 2015

(54) METHOD AND APPARATUS FOR PROVIDING SECURE WEB TRANSACTIONS USING A SECURE DNS SERVER

(75) Inventor: Vijay Anand Seshadri, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 991 days.

(21) Appl. No.: 12/147,761

(22) Filed: Jun. 27, 2008

(51) Int. Cl.
G06F 9/455 (2006.01)
G06F 21/46 (2013.01)

(52) U.S. Cl.
CPC ........................................ G06F 21/46 (2013.01)
USPC .................................................. 726/14; 718/1

(58) Field of Classification Search
CPC .......... G06F 21/30; G06F 2009/45587; G06F 2009/45595
USPC .................................................. 726/14; 718/1
See application file for complete search history.

(56) References Cited

U.S. PATENT DOCUMENTS

| | | | |
|---|---|---|---|
| 7,844,954 B2 * | 11/2010 | Venkitachalam et al. ..... | 717/130 |
| 2007/0106986 A1 * | 5/2007 | Worley, Jr. ......................... | 718/1 |
| 2007/0214233 A1 * | 9/2007 | Cromer et al. .................. | 709/217 |
| 2007/0294676 A1 * | 12/2007 | Mellor et al. .................. | 717/139 |
| 2008/0215796 A1 * | 9/2008 | Lam et al. ...................... | 711/100 |
| 2008/0244028 A1 * | 10/2008 | Le et al. ......................... | 709/208 |
| 2008/0270674 A1 * | 10/2008 | Ginzton ............................ | 711/6 |
| 2008/0320127 A1 * | 12/2008 | Fries ............................. | 709/224 |
| 2009/0089300 A1 * | 4/2009 | Vicente .......................... | 707/100 |
| 2009/0089410 A1 * | 4/2009 | Vicente .......................... | 709/223 |
| 2009/0089625 A1 * | 4/2009 | Kannappan et al. ............ | 714/39 |
| 2009/0112814 A1 * | 4/2009 | Statia et al. ....................... | 707/3 |
| 2009/0182928 A1 * | 7/2009 | Becker et al. ..................... | 711/6 |
| 2009/0183173 A1 * | 7/2009 | Becker et al. .................. | 719/313 |
| 2009/0248611 A1 * | 10/2009 | Xu et al. .......................... | 707/1 |

OTHER PUBLICATIONS

"VMWare Workstation 5 User's Manual" © 1998-2005 VMWare Inc. (466 pages) http://www.vmware.com/pdf/ws5_manual.pdf.*
Brain, Marshall. "How Domain Name Servers Work" article published Dec. 15, 2005 as verified by the Internet Archive (7 pages) http://web.archive.org/web/20051215055529/www.howstuffworks.com/dns.htm/printable.*
Wikipedia article for "Hypervisor" as published on Jun. 21, 2008 (4 pages) http://en.wikipedia.org/w/index.php?title=Hypervisor&oldid=220860412.*
Bradbury, Danny. "How virtualizing applications can protect computers from their installed software" Published Mar. 21, 2006 http://www.computerweekly.com/Articles/2006/03/21/214867/How-virtualising-applications-can-protect-computers-from-their-installed.htm?printerfriendly=true.*

(Continued)

*Primary Examiner* — Joseph P Hirl
*Assistant Examiner* — Thomas Gyorfi
(74) *Attorney, Agent, or Firm* — Wilmer Cutler Pickering Hale and Dorr LLP

(57) ABSTRACT

A method and apparatus for providing a secure domain name services by utilizing a hypervisor to provide an isolated execution environment in which a secure browser session can be instantiated. The secure browser session utilizes a secure DNS server to provide domain name services.

15 Claims, 3 Drawing Sheets

(56) References Cited

OTHER PUBLICATIONS

Richard S. Cox et al. "A Safety-Oriented Platform for Web Applications" Proceedings on the 2006 IEEE Symposium on Security and Privacy. (15 pages) http://www.cs.washington.edu/homes/gribble/papers/gribble-Tahoma.pdf.*

"Metropipe: The World's leading Anonymous Surfing Provider" Free Portable Virtual Privacy Machine v1.2 released Apr. 17, 2006 (6 pages). http://www.metropipe.net/pvpm.php.*

John Paul Cook. "Make a Virtual Machine Your Safe Internet-Browsing Sandbox" originally published Jan. 30, 2006. (5 pages total) http://www.devx.com/vmspecialreport/Article/30377 and http://www.devx.com/vmspecialreport/Article/30377/1954?pf=true.*

Mike Fratto. "The Fragility of DNS" Published on Jul. 17, 2007 by Network Computing. (1 page) http://www.networkcomputing.com/servers-storage/the-fragility-of-dns.php.*

R. Arends et al. "RFC 4033: DNS Security Introduction and Requirements" © 2005 The Internet Society. (21 pages) http://www.rfc-editor.org/rfc/pdfrfc/rfc4033.txt.pdf.*

Microsoft TechNet: "DNS Tools". Published Jan. 21, 2005 (3 pages) http://technet.microsoft.com/en-us/library/cc783848%28WS.10,printer%29.aspx.*

Microsoft TechNet: "Nslookup" Published Jan. 21, 2005 (3 pages) http://technet.microsoft.com/en-us/library/cc756097%WS.10,printer%29.aspx.*

"VMTN Blog: Hypervisor? That's no hypervisor!" Posted Mar. 23, 2007 (1 page) http://blogs.vmware.com/vmtn/2007/03/hypervisor_that.html.*

Timothy Prickett Morgan. "Workstation 6 Previews VMware's Future Server Virtualization" Published May 9, 2007 (4 pages) http://www.itjungle.com/breaking/bn050907-story03.html.*

Jeanna N. Matthews et al. "Running Xen: A Hands-On Guide to the Art of Virtualization" Published Apr. 6, 2008 by Prentice Hall Inc. (excerpt from p. 19).*

T. Berners-Lee et al. "RFC 1738: Uniform Resource Locators (URL)" Published Dec. 1994 (25 pages) http://www.rfc-editor.org/rfc/pdfrfc/rfc1738.txt.pdf.*

Robert Cowart et al. "Platinum Edition Using® Microsoft® Windows® XP" Published Jul. 24, 2003 by Que Inc. Excerpt from chapter 14 (29 pages).*

Edward Mendelson. "Microsoft Internet Explorer 6.0" Published Oct. 15, 2002. (4 pages) http://www.pcmag.com/article2/0,2817,541298,00.asp.*

"IBM Systems Virtualization Version 2 Release 1" © 2005 IBM (pp. 1-12) http://publib.boulder.ibm.com/infocenter/eserver/v1r2/topic/eicay/eicay.pdf.*

Jinpeng Huai et al. "CIVIC: A Hypervisor Based Virtual Computing Environment" © 2007 Springer-Verlag Berlin Heidelberg (pp. 809-820) http://pdf.aminer.org/000/299/287/specification_based_computing_environments_for_information_management.pdf.*

Mark Mayo. "VMUNIX Blues: A quick look at paravirtualization support in VMWare and Linux" Published Jul. 7, 2007 (4 pages) http://www.vmunix.com/mark/blog/archives/2007/07/07/a-quick-look-at-paravirtualization-support-in-vmware-and-linux/.*

"Desktop Hypervisors—ROUNDUP" Published Nov. 2, 2007 at shift-eight (*) generation blog (3 pages) http://shifteightgeneration.com/content/desktop-hypervisors-roundup.*

Greg Shields. "Q. Is VMWare Workstation a type 1 or type 2 hypervisor?" Published Nov. 2, 2010 at Windows IT Pro.com (1 page) http://windowsitpro.com/virtualization/q-vmware-workstation-type-1-or-type-2-hypervisor.*

Andrew Kutz et al. "Expert Tips on Virtualization Selection and Strategies" Published Apr. 23, 2008 by TechTarget, Sponsored by Saavis (13 pages) http://www.meritalk.com/uploads_legacy/whitepapers/Savvis-e-guide_4.23.pdf.*

Anthony Ligouri. "Tales of a Code Monkey: The Myth of Type I and Type II hypervisors" Published Oct. 8, 2007 (2 pages) http://blog.codemonkey.ws/2007/10/myth-of-type-i-and-type-ii-hypervisors.html.*

Scott Loveland et al. "Software Testing Techniques: Finding the Defects that Matter" © 2004 Charles River Media Inc. Excerpt from Chapter 16 (7 pages).*

Srihari Palangala. "List of hypervisors keeps growing—what do you use in your test lab?" posted Jun. 19, 2008 (2 pages) http://vmlab.wordpress.com/2008/06/19/list-of-hypervisors-keeps-growing-what-do-you-use-in-your-test-lab/.*

"What is hypervisor?—A Word Definition From the Webopedia Computer Dictionary" article dated Jul. 15, 2007 (1 page) http://web.archive.org/web/20070715041933/http://www.webopedia.com/TERM/H/hypervisor.html.*

Margaret Rouse. "What is hypervisor?—Definition from WhatIs.com" published Oct. 2006 (2 pages) http://searchservervirtualization.techtarget.com/definition/hypervisor.*

"ESX Server 3 Configuration Guide" © 2006-2008 VMWare Inc. (309 pages) http://www.inlab.de/balanceng/vi3_35_25_3_server_config.pdf.*

Rouse, Margaret. "SearchVMWare: host operating system" Last Updated Nov. 2007 (1 page) http://searchvmware.techtarget.com/definition/host-operating-system.*

Rouse, Margaret. "SearchServerVirtualization: guest OS" Last Updated Sep. 2006 (1 page) http://searchservervirtualization.techtarget.com/definition/guest-OS.*

"ZoneAlarm ForceField—Virtualized Browser Security," Copyright 2003-2008 Check Point Software Technologies Ltd.

* cited by examiner

METHOD AND APPARATUS FOR PROVIDING SECURE WEB TRANSACTIONS USING A SECURE DNS SERVER

BACKGROUND

1. Field of the Invention

Embodiments of the present invention generally relate to network security techniques and, more particularly, to a method and apparatus for providing secure domain name services.

2. Description of the Related Art

Computer users have begun to rely upon their home computers to utilize on-line banking and e-commerce services. The users of online banking and e-commerce services have become more and more concerned with computer-related viruses as well as attacks specifically focused on web browsers. Such attacks are intended to compromise sensitive and confidential information that a user provides to the banking or e-commerce website during an on-line session.

Most browser-related security techniques provide a blacklisting function that does not allow a browser to access websites that are on a blacklist. These blacklisted websites are generally known by an anti-virus service provider to be security risks. The anti-virus service provider provides the blacklist to the host computer system via virus protection software. The anti-virus software informs the browser of certain websites that are not to be visited because they exist to compromise sensitive and confidential information. Such blacklisting techniques require the security solution to be constantly updated in response to ever changing and different attacker mechanisms. Consequently, such blacklisting techniques do not provide a perfect solution.

In one form of attack on a host computer, a browser is compromised when a user enters a particular website to be visited, e.g., a banking website, and malicious software directs the browser to an unauthorized domain name services (DNS) server. The unauthorized DNS server provides an IP address to the browser for an unauthorized banking website that has the look and feel of an authentic banking website. The unauthorized website will, in all likelihood be a malicious website. Unknowingly, the user enters their username and password into an unauthorized and malicious website, compromising their security.

In other instances, the malicious DNS server may direct the user to an appropriate and correct web server, but the malicious DNS server monitors all communications between the host computer and the web server. In this manner, the user's confidential information that is transmitted to use the banking services such as password, user name, and the like will be compromised.

Therefore, there is a need in the art for a method and apparatus for providing a secure DNS server.

SUMMARY OF THE INVENTION

Embodiments of the present invention comprise a method and apparatus for providing a secure domain name services by utilizing a hypervisor to provide an isolated execution environment in which a secure browser session can be instantiated. The secure browser session utilizes a secure DNS server to provide domain name services.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
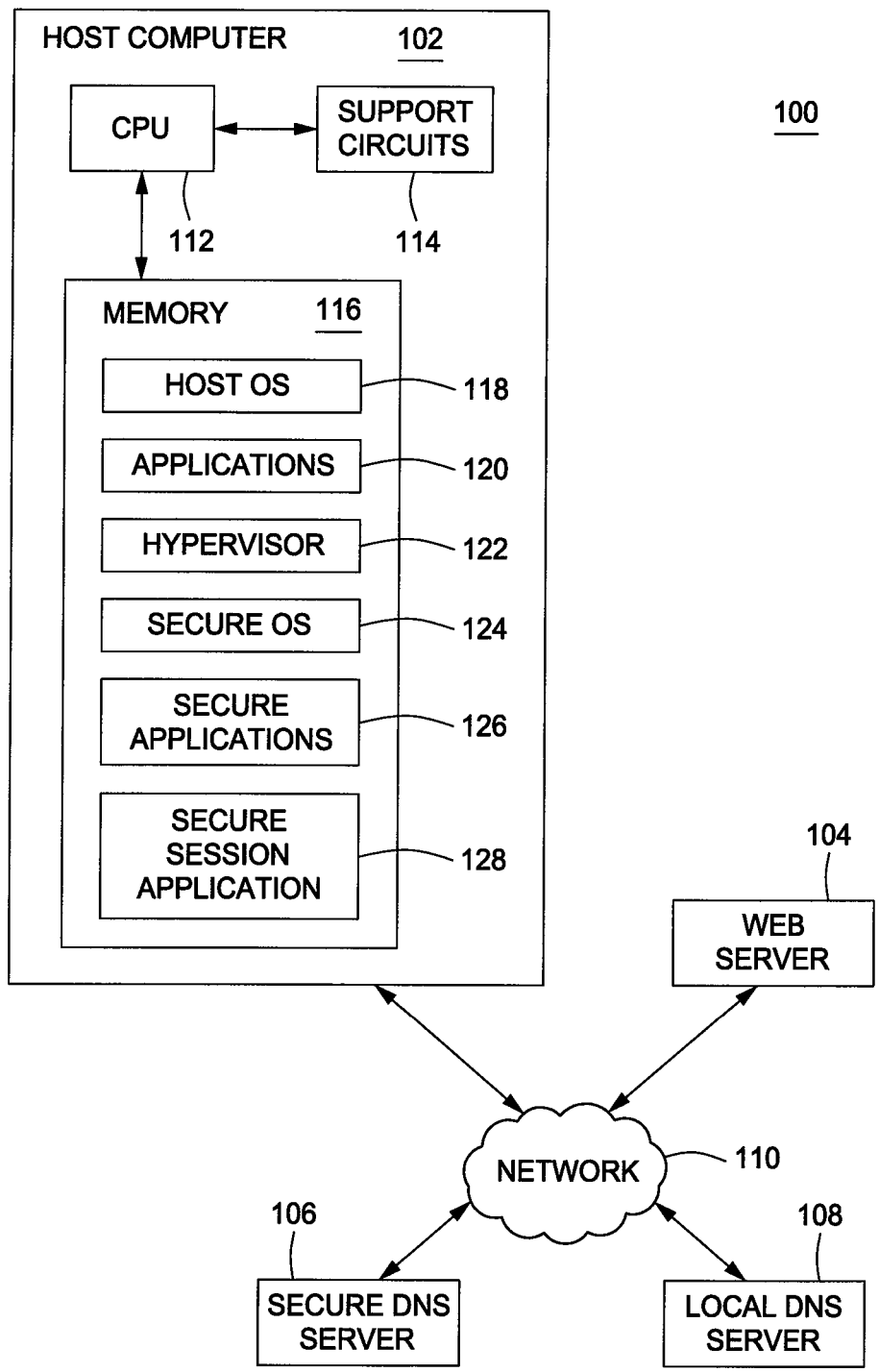
FIG. 1 depicts a block diagram of a computer network utilizing embodiments of the present invention to provide secure domain name services (DNS) to a host computer.

FIG. 1 depicts a computer network 100 comprising a host computer 102, a web server 104, a secure domain name services (DNS) server 106, and a local DNS server 108. The host computer 102, the web server 104, the secure DNS server 106, and the local DNS server 108 are coupled to one another through a network 110. The network 110 provides digital communication services amongst the computers and servers via at least one of a local area network, wide area network, wireless network, or other Internet Protocol-based networks. For the host computer 102 to communicate with the web server 104, the host computer 102 requires an IP address of the web server 104. In one embodiment of the invention, this IP address is provided to the host computer 102 using an isolated execution environment to communicate with a secure DNS server 106.

The host computer 102 is any computing device that is capable of supporting a browser for browsing the Internet, including a laptop computer, a desktop computer, personal digital assistants, mobile telephones, and the like. Generally speaking, the host computer 102 can be any form of computing device that utilizes domain name services to facilitate web browsing.

The host computer 102 comprises a central processing unit (CPU) 112, support circuits 114, and memory 116. The central processing unit 112 generally comprises one or more commercially available processors, microprocessors, microcontrollers or a combination thereof. The support circuits 114 are generally well known circuits that facilitate functionality of the CPU 112. These support circuits 114 comprise, for example, power supplies, clock circuits, cache, network interface cards, bus circuits, peripheral drivers, I/O devices, and the like. The memory 116 is any form of digital storage including for example semiconductor memory, optical memory, magnetic memory and the like.

In one embodiment of the invention, the memory 116 stores, for use by the CPU 112, a host operating system 118, applications 120 that are supported by the host operating system 118, a hypervisor 122 for establishing an isolated execution environment (IEE), a secure operating system 124 that is executed in the IEE, secure applications 126 that are executed in the IEE, and a secure session application 128 (e.g., a secure DNS client).

The applications 120 comprise a browser for accessing information at web server 104. The browser will communicate through the network 110 with a web server 104. The browser user enters the uniform resource locator (URL) of the web server, but to communicate with the web server the URL must be mapped to an IP address. To identify the IP address of the web server on the network 110, the browser contacts a local DNS server 108 to request an IP address for the web server 104. It is this communication with the local DNS server 108 that can be compromised by malicious software (malware) that may reside in the memory 116. The malicious software can redirect the request to a malicious DNS server that provide incorrect information or monitor the user information that is provided to the web server 104.

In one embodiment of the invention, upon a need for use of a secure DNS server, i.e., the communication with the web server contains confidential information, the hypervisor 122 is launched to form an IEE. An operating system, such as Linux, is executed within the IEE to provide a secure operating system 124. Upon the execution of the secure operating system 124, various applications that require the security of the secure operating system can be launched within the IEE.

For example, a browser can be launched in the IEE to form a secure application 126. The secure application (browser) can be utilized for accessing brokerage and/or banking services through the web within the IEE. To launch such services, the secure session application 128 is executed upon a specific key combination (e.g., Alt-4) or other information being entered into the host operating system 118. When this information is entered, the secure session application 128 is instantiated. The secure session application 128 launches the hypervisor 122 to form the IEE containing the secure operating system 124 and secure applications 126 (including a secure browser). The secure browser is directed (the IEE is "hardwired") to access only the secure DNS server 106 for DNS services. As such, when a bank URL is entered into the secure browser, the secure browser contacts the secure DNS server 106 for the bank web server IP address. In this manner, the secure session provided by the hypervisor and the secure operating system is not compromised by any local DNS server 108 that may function as a malicious DNS server.

In one embodiment of the invention, the hypervisor 122 is Type-1 hypervisor such as a XEN hypervisor, distributed by Citrix Systems, Inc. A Type-1 hypervisor is launched and functions on the "bare metal" of the host computer 102. In other embodiments of the invention, the hypervisor may be a Type-2 hypervisor that operates in conjunction with and supported by the host operating system 118. In either instance, the hypervisor provides a IEE in which the secure operating system and the secure applications can be executed without reliance on the host operating system and its applications.

Figure 2:
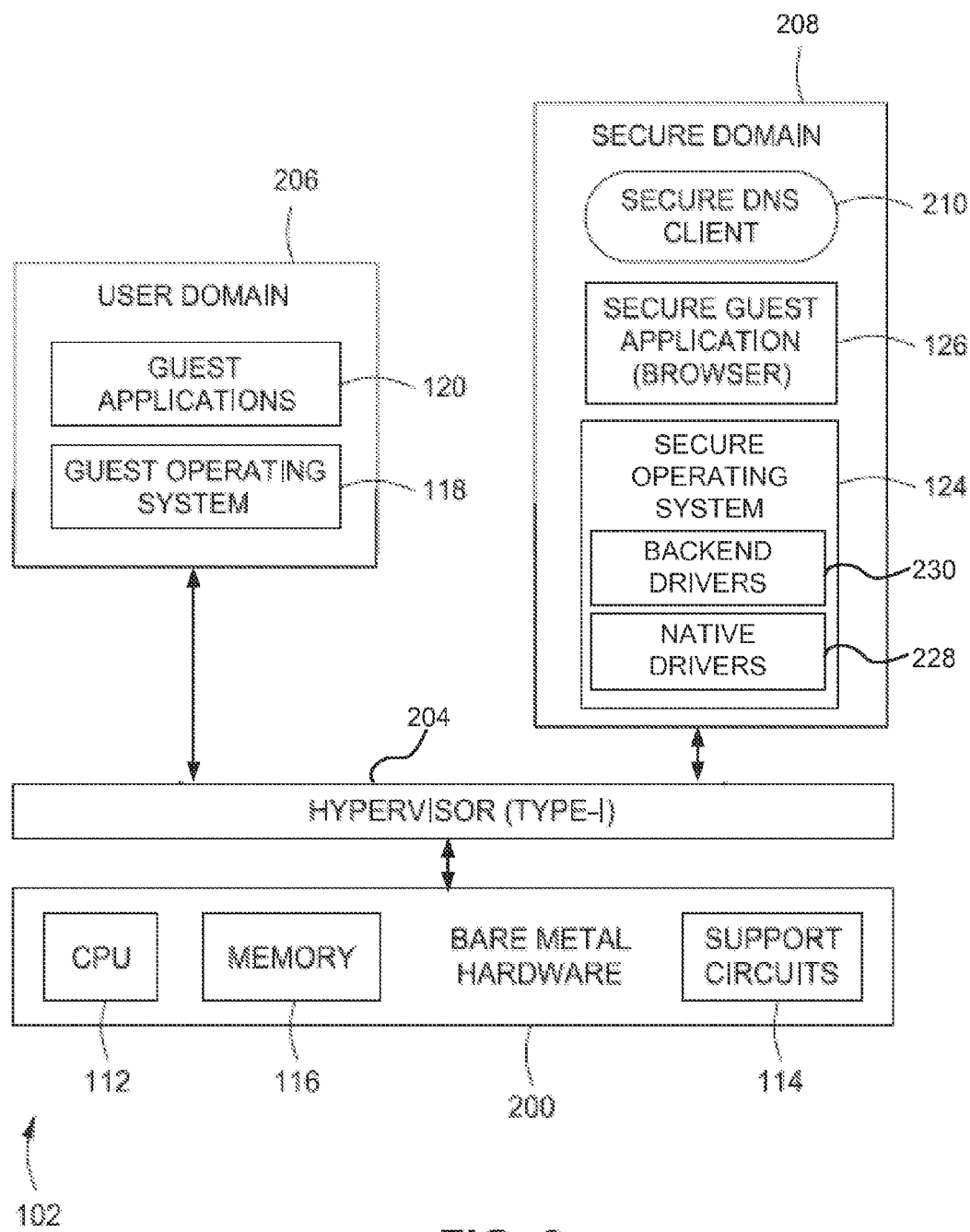
FIG. 2 depicts a functional block diagram of a Type-1 hypervisor being used to create an isolated execution environment for an application in accordance with one embodiment of the invention.

FIG. 2 depicts a functional block diagram of an IEE established within the host computer 102 in accordance with one embodiment of the invention. In this embodiment, the IEE is launched upon a bare metal platform 200 of the host computer hardware 102 (i.e., CPU 112, memory 116 and support circuits 114). The hypervisor 204 supports the user domain 206 and the secure domain 208. The user domain 206 executes various guest applications 120 using an unmodified host operating system (a guest operating system) 118 that interact with the virtualized environment of the hypervisor 204. Within this user domain 206, there are conventional functional layers (not shown) that operate in a conventional manner in their interaction with the hypervisor 204. As such, a user experiences the typical operation of a computer using a standard operating system 118 such as XP, LINUX and the like.

The secure domain 208 that is formed within the IEE supports at least one application 126 (e.g., a browser) as well as an operating system 124 comprising the backend virtual drivers 230 and native drivers 228 that interact with the hypervisor 204. All communications to the hardware platform 200 are controlled by the hypervisor 204 that resides between the various domains 206 and 208. In this manner, the secure domain can be utilized to support a secure operating system 124 and applications 126 within an IEE. The applications, including a browser 126, communicate with a secure DNS server using a secure DNS client 210.

Figure 3:
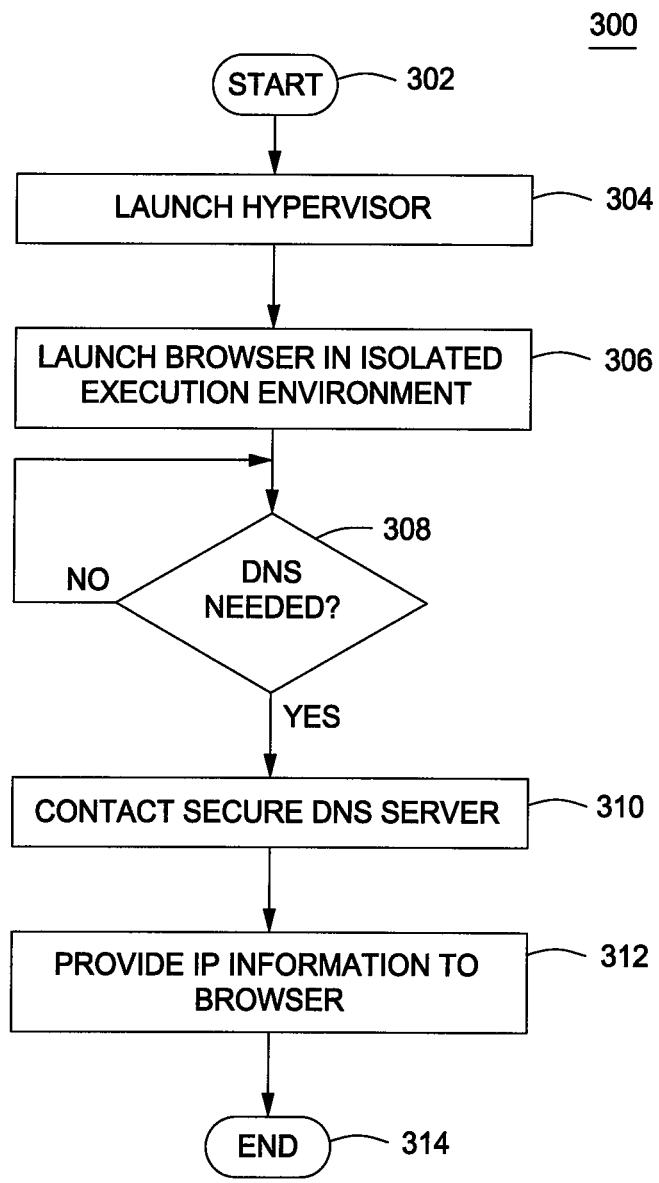
FIG. 3 depicts a flow diagram of a method of providing a secure DNS server to a host computer in accordance with one embodiment of the present invention.

FIG. 3 depicts a flow diagram of a method 300 of operation of the secure session application 128 that launches the IEE when needed to provide secure DNS. The method 300 begins at step 302 and proceeds to step 304, wherein the hypervisor is launched. Typically, method 300 begins upon a specific key command being entered by the user to launch a IEE because a secure session is desired. In other embodiments, the method 300 may be launched automatically upon the entry of a specific URL into the unsecure browser running on the host operating system. When that unsecure URL is entered in that browser application, the secure session application recognizes that URL as being one that has been previously identified by the user as needing a secure environment for operation. In either instance, the method 300 launches the hypervisor to form the IEE, and at step 306, a browser is launched in that IEE provided by the hypervisor. Once operating in the IEE, the keyboard mouse and display input/output functionality is always processed by the hypervisor. As such, any malicious software that resides within the host operating system or applications associated with the host operating system, will not be able to compromise the information that is communicated through the secure environment.

At step 308, the method 300 queries whether DNS domain name services are needed, e.g., has the user entered a URL into the secure browser. If no DNS services are needed at the moment, the method 300 waits until such services are needed. Upon the need being recognized, the method 300 proceeds to step 310 wherein the secure DNS server is contacted. Typically, the secure DNS server IP address is hard coded into the secure session application software such that the method will only access the secure DNS server. Upon contact of the secure DNS server, the method 300 requests the appropriate IP address corresponding to the web server URL.

At step 312, the method 300 provides the IP address to the browser within the IEE and the user begins a secure transaction. Once the secure transaction begins, the method 300 ends at step 314. The browser then uses the IP information in a normal manner to communicate information to the web server. Since a secure DNS server provides the IP address of the web server, the address information is secure and trusted. Consequently, the user's information that is entered and directed to/from the web server is secure.

While the foregoing is directed to embodiments of the present invention, other and further embodiments of the invention may be devised without departing from the basic scope thereof, and the scope thereof is determined by the claims that follow.

What is claimed is:

1. A method for providing secure domain name services to a host computer comprising:

launching, on a host computer, a hypervisor, wherein the hypervisor is configured to support a user domain and a secure domain, wherein the user domain is configured to execute various guest applications using functional layers and an unmodified host operating system that interacts with the hypervisor and secure domain, wherein the hypervisor is a type-1 hypervisor, wherein the unmodified host operating system functions as a guest operating system, and wherein the secure domain comprises backend and native drivers that interact with the hypervisor;

launching, on the host computer, an isolated execution environment using the hypervisor, wherein the backend and native drivers that interact with the hypervisor provide a secure session for launching the isolated execution environment without reliance on a host operating system or host applications to prevent being compromised by any local malicious software residing within the host operating system or host applications;

launching, in response to the launch of the isolated execution environment, a secure application within the isolated execution environment;

requesting domain name services from within the isolated execution environment, wherein the domain name services are provided by a secure domain name services server whose address is hard-coded into the isolated execution environment;

contacting the domain name services server in the event domain name services are required; and providing the address to the secure application within the isolated execution environment to establish a secure connection.

2. The method of claim 1 wherein the isolated execution environment is launched on the host computer and further comprises:
 launching an operating system; and
 launching a browser.

3. The method of claim 2 wherein the operating system is Linux.

4. The method of claim 1, wherein the isolated execution environment is launched in response to the user domain detecting a need for a secure domain name service connection.

5. The method of claim 4, wherein detecting a need for a secure domain name service connection comprises recognizing a web server URL identified as needing a secure environment for operation and communication.

6. A method for providing secure domain name services to a host computer comprising:
 launching, on the host computer, a hypervisor, wherein the hypervisor is configured to support a user domain and a secure domain, wherein the user domain is configured to execute various guest applications to support a conventional operating system using functional layers and an unmodified host operating system that interacts with the hypervisor and secure domain, wherein the hypervisor is a type-1 hypervisor, wherein the conventional operating system comprises an unmodified host operating system functioning as a guest operating system, and wherein the secure domain comprises backend and native drivers that interact with the hypervisor;
 launching, on the host computer, an isolated execution environment to provide a secure environment for communicating with a web server, wherein the isolated execution environment is created using the hypervisor, wherein the backend and native drivers that interact with the hypervisor provide the secure environment without reliance on the conventional operating system or the host computer to prevent being compromised by any local malicious software residing within the conventional operating system;
 launching, in response to the launch of the isolated execution environment, a secure web browser application within the isolated execution environment;
 requesting domain name services from within the isolated execution environment, wherein the domain name services are provided by a secure domain name services server whose address is hard-coded into the isolated execution environment;
 contacting the domain name services server in the event domain name services are required; and
 providing the address to the browser within the isolated execution environment to establish a secure connection.

7. The method of claim 6 wherein the launching step is initiated upon a user entering a specific key combination in the conventional operating system.

8. The method of claim 6 wherein the launching step is initiated upon a user entering a specific key URL into a web browser supported by the conventional operating system.

9. The method of claim 6 wherein the isolated execution environment is launched on the host computer and further comprises:
 launching an operating system; and
 launching a browser.

10. The method of claim 9 wherein the operating system is Linux.

11. Apparatus for providing secure domain name services to a host computer comprising:
 a hardware platform configured to support a hypervisor that creates a user domain, a secure domain, and an isolated execution environment, wherein the user domain is configured to execute various guest applications to support a conventional operating system using functional layers and an unmodified host operating system that interacts with the hypervisor and secure domain and the isolated execution environment provides a secure environment for communicating with a web server and requesting domain name services, wherein the domain name services are provided by a secure domain name services server whose address is hard-coded into the isolated execution environment, wherein the hypervisor is a type-1 hypervisor, wherein the conventional operating system comprises an unmodified host operating system functioning as a guest operating system, wherein the secure domain formed within the isolated execution environment comprises backend and native drivers that interact with the hypervisor to provide a secure environment, wherein the isolated execution environment is configured to launch a secure web browser within the isolated execution environment in response to a launch of the isolated execution environment, and wherein the secure environment, without reliance on the conventional operating system, prevents being compromised by any local malicious software residing within the conventional operating system when the domain name services server is contacted in the event domain name services are required and the address is provided to the browser within the isolated execution environment to establish a secure connection.

12. The apparatus of claim 11 wherein the isolated execution environment is initiated upon a user entering a specific key combination in the conventional operating system.

13. The apparatus of claim 11 wherein the isolated execution environment is initiated upon a user entering a specific key URL into a browser supported by the conventional operating system.

14. The apparatus of claim 11 wherein the isolated execution environment comprises:
 an operating system; and
 a browser.

15. The apparatus of claim 14 wherein the operating system is Linux.

* * * * *